United States Patent [19]
Keefer

[11] 3,750,187
[45] July 31, 1973

[54] RECORDING AND INTEGRATOR UNIT

[75] Inventor: Richard D. Keefer, Ann Arbor, Mich.

[73] Assignee: Gelman Instrument Company, Ann Arbor, Mich.

[22] Filed: June 26, 1972

[21] Appl. No.: 265,990

Related U.S. Application Data

[63] Continuation of Ser. No. 56,390, July 20, 1970, abandoned, which is a continuation-in-part of Ser. No. 7,189, Jan. 30, 1970, abandoned.

[52] U.S. Cl............... 346/49, 235/61.6 A, 235/183, 318/696, 318/625, 346/13
[51] Int. Cl........................ G01d 1/04, G01d 9/30
[58] Field of Search .................. 346/13, 49, 32, 44, 346/66; 235/183, 61 C, 61 D, 61.6 A, 61.6 B; 318/696, 625

[56] References Cited
UNITED STATES PATENTS 2,834,247  5/1958  Pickels............................. 346/13 X
2,960,378  11/1960  Wickerham........................... 346/49
3,531,633  9/1970  Johnson............................. 235/183

FOREIGN PATENTS OR APPLICATIONS 861,228  2/1961  Great Britain....................... 346/13

Primary Examiner—Joseph W. Hartary
Attorney—Arthur Raisch, Robert A. Choate et al.

[57] ABSTRACT

The unit disclosed has independently operated signal and integrator pens which provide separate traces on the chart paper of a curve representing the changes over a period of time in the magnitude of the input signal and the area under the input signal curve. The area curve is in the form of a zigzag integration line which requires only a narrow strip of the total chart width. This zigzag trace is produced by automatically reversing the pen direction as soon as it has traversed a certain predetermined recording width. The unit has an electronic integrator circuit with an electro-mechanical output which controls the integrator pen.

15 Claims, 14 Drawing Figures

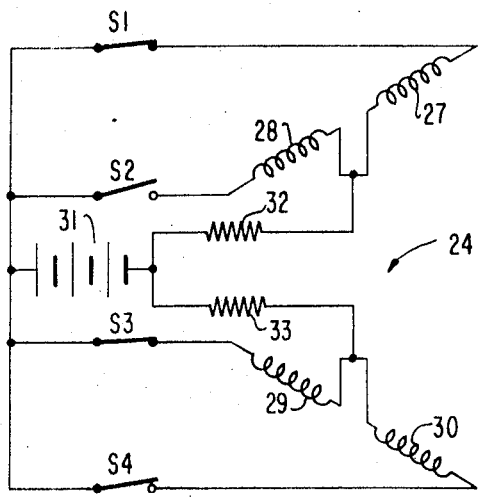
FIG. 3
| STEP | S1  | S2  | S3  | S4  |
|------|-----|-----|-----|-----|
| 1    | ON  | OFF | ON  | OFF |
| 2    | ON  | OFF | OFF | ON  |
| 3    | OFF | ON  | OFF | ON  |
| 4    | OFF | ON  | ON  | OFF |
| 1    | ON  | OFF | ON  | OFF |
FIG. 3A
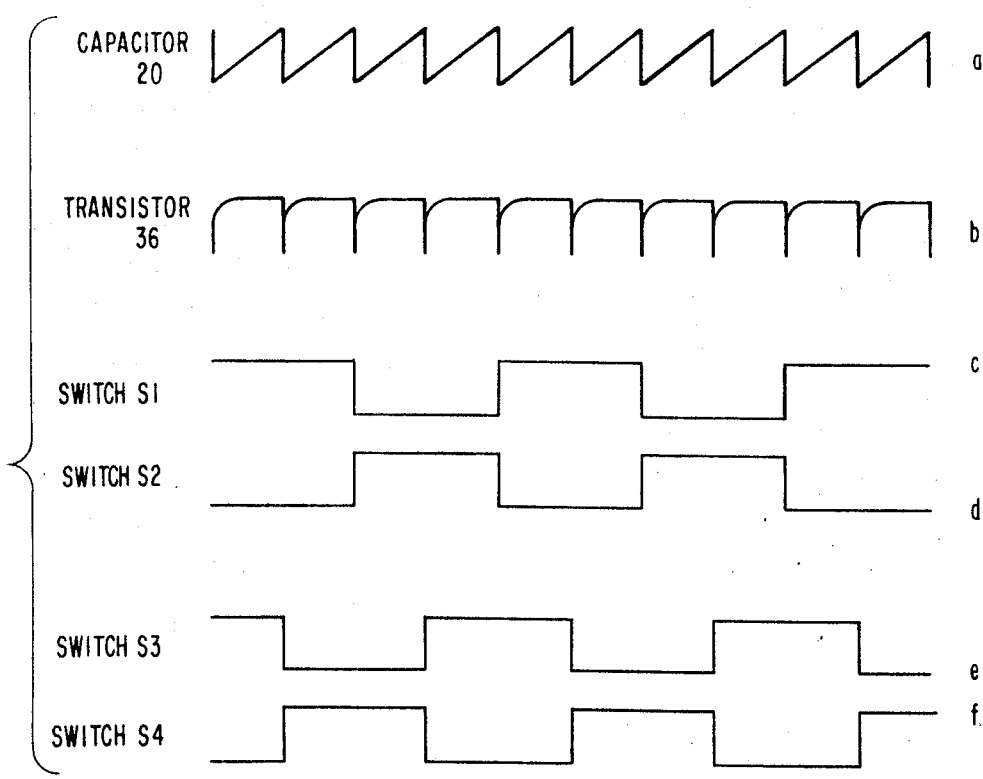
FIG. 5

SHEET 5 OF 5
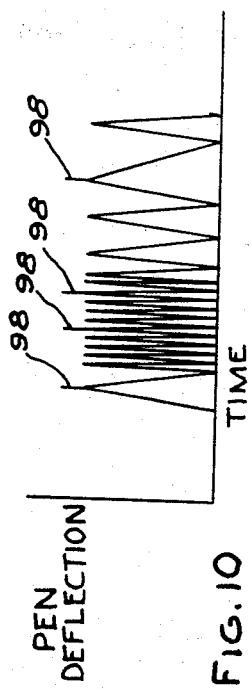
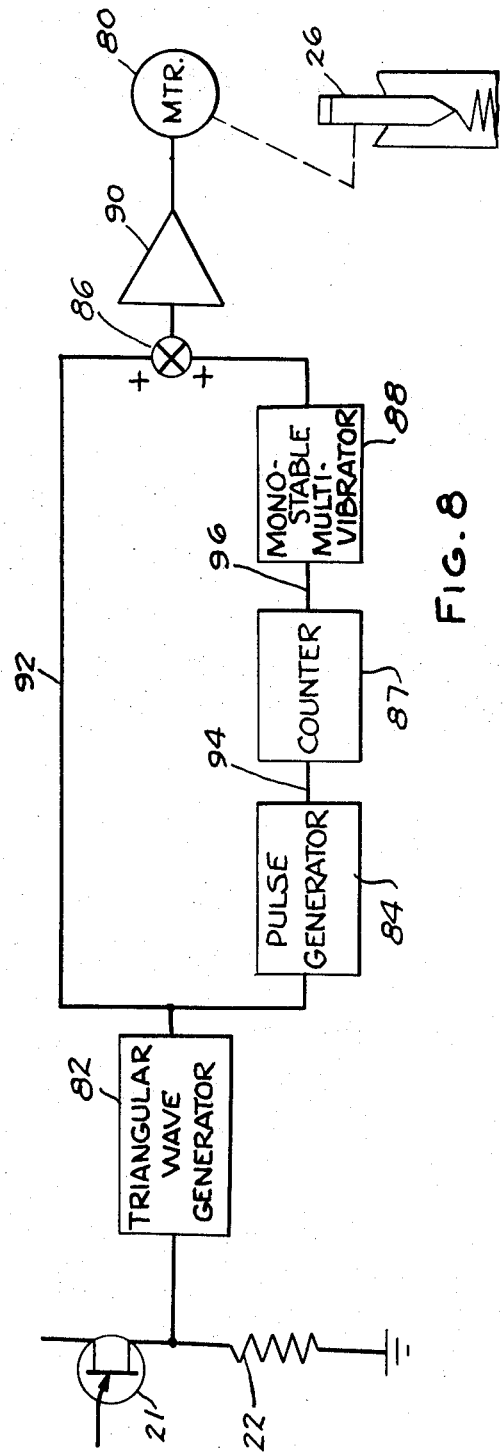
INVENTOR.
RICHARD D. KEEFER
BY
Barnes, Kisselle, Raisch & Choate
ATTORNEYS

RECORDING AND INTEGRATOR UNIT

CROSS-REFERENCE TO RELATED APPLICATION

This is a continuation of my copending application Ser. No. 56,390, filed July 20, 1970 which is a continuation-in-part of my copending application, Ser. No. 7,189, filed on Jan. 30, 1970, and now abandoned in favor of application Ser. No. 56,390.

BACKGROUND OF THE INVENTION

1. Field of the Invention

The present invention generally relates to chart recorders useful in instrumentation and measuring systems, and more particularly to a chart recorder incorporating an integrator capable of significantly increased accuracy and providing a trace in a very narrow width on the chart.

2. Description of the Prior Art

Instrumentation recorders are known in the art which provide both signal and area or integration traces. Typically, these recorders employ ball and disc mechanical integrators which are driven by a servo-mechanism. Although, in general, these devices have performed satisfactorily in many applications they have a number of disadvantages which tend to limit their usefulness in present day applications which require greater accuracy. For example, the ball and disc integrator and recorder system is subject to the errors of the main servo-mechanism. Thus, any hysteresis or response errors in the servo-mechanism constitute part of the input to the mechanical ball and disc. Furthermore, in mechanical integrators the errors are largest for very small input signals or for very small changes in the input. These errors, which are directly attributable to hysteresis and friction, are a decided disadvantage when measuring very small areas of small amplitude as in the globulin fractions of an electrophoregram. In these instances, errors of just a few integrator counts can amount to a significant percentage of the area measured.

SUMMARY OF THE INVENTION

It is therefore an object of the present invention to provide a recording integrator which is completely independent of any errors in the main servo-mechanism.

It is another object of this invention to provide a highly accurate recording integrator system the accuracy of which remains the same regardless of input signal magnitude.

It is an ancillary object of the instant invention to provide a recording and integrator unit wherein the integration constant can be easily changed and adjusted and requires no mechanical time base reference.

According to the present invention, the foregoing and other objects are attained by providing a recording integrator which is completely electronic except for the electro-mechanical output to drive the recording pen. The recording and integrator unit has independently operated signal and integrator pens which provide separate traces on the chart paper. The signal pen is driven by a servo-mechanism whereas the input for the integrator is taken from the input amplifier and hence is independent of any errors in the servo-mechanism. The integrator itself comprises a voltage to frequency converter which is operative to produce a series of pulses having a frequency that is proportional to the integrated input voltage. In two embodiments these pulses are used to energize a stepping motor which drives the integrator pen through mechanical couplings. In one of these embodiments the mechanical coupler includes a bidirectional helical cam and follower. This cam and follower output arrangement is a particularly advantageous feature of the invention since it permits recording the area curve in the form of a zigzag integration line which requires only a narrow strip of the total chart width. In the other embodiments the pulses are processed to drive the integrator pen through a pen motor.

BRIEF DESCRIPTION OF THE DRAWINGS

The specific nature of the invention, as well as other objects, aspects, uses and advantages thereof, will clearly appear from the following description and from the accompanying drawings, in which:

FIG. 3 is a simplified schematic diagram of the stepping motor which drives the integrator pen.

FIG. 3A is a table which tabulates the on-off sequences of the switches shown in FIG. 3.

FIG. 5 is a timing diagram showing the signals at various points in the circuit shown in FIG. 4.

FIGS. 6, 7 and 8 show three respective modifications of the recording and integrator unit.

FIG. 10 illustrates a typical trace produced by the integrator pen of the third modification of FIG. 8.

Figure 1:
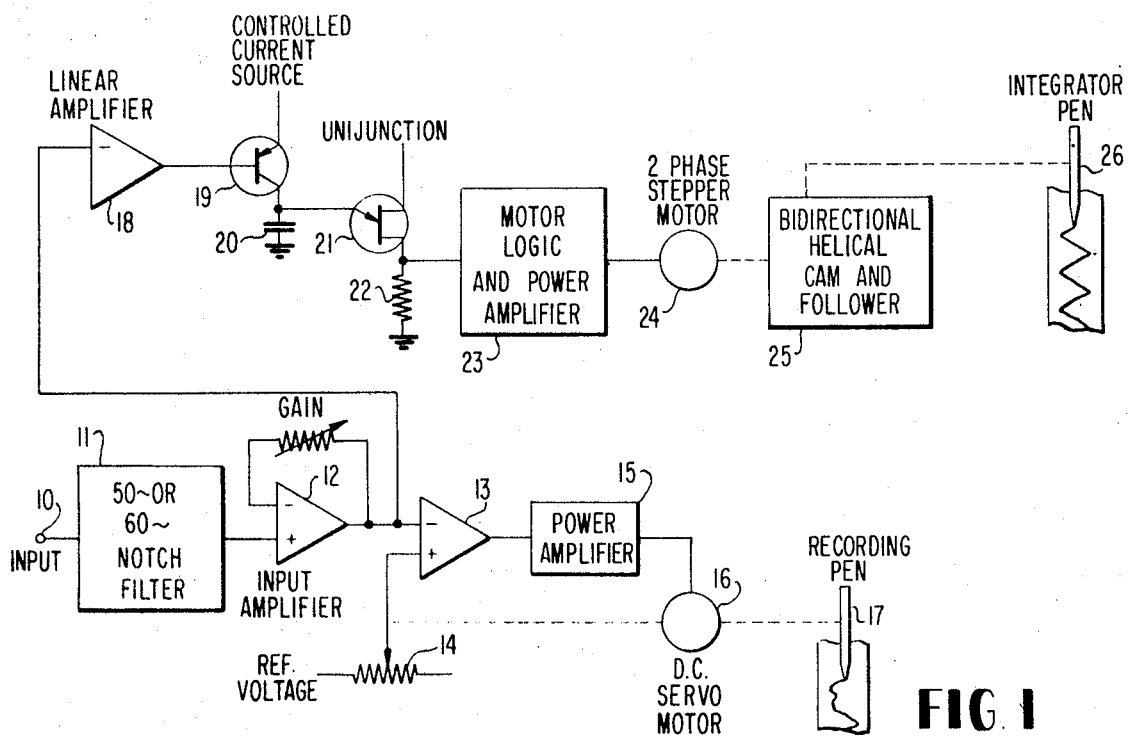
FIG. 1 is a partially schematic and partially block diagram of the recorder and integrator unit according tthe invention.

Referring now to the drawings wherein like reference numerals designate identical or corresponding parts throughout the several views, and more particularly to FIG. 1 which shows the recording system according to the invention, an input signal is applied at terminal 10. The input signal then passes through a 50 or 60 Hz filter 11 to eliminate any power line interference. The filtered input signal is then amplified by input amplifier 12 and supplied as one input of amplifier comparator circuit 13. The other input to comparator circuit 13 is supplied by the wiper output of a precision slidewire potentiometer 14. Potentiometer 14 is preferably powered from a Zener stabilized reference voltage source (not shown). A difference voltage of the proper polarity is developed at the output of comparator circuit 13, and this difference voltage is the input to servo power amplifier 15. Amplifier 15 supplies the energizing voltage to D.C. servo motor 16 which is connected both directly to the wiper of potentiometer 14 and through an arrangement of pulleys and cables to the signal pen 17. In operation, the servo motor varies the output of the precision slidewire potentiometer 14 until its voltage output is exactly equal to the input voltage which is to be measured or recorded. Since the servo motor is also connected to signal pen 17, it moves this pen to provide a trace of the input signal.

This invention features an electronic integrator the input for which is taken directly from the output of the servo recorder's input amplifier 12. This input is fed into a linear amplifier 18 which provides additional gain, isolation, and proper operating levels for the remainder of the circuit. The output of amplifier 18 is connected to the base of transistor 19 which has its emitter connected to a controlled current source (not shown) and its collector connected to a charging capacitor 20. Transistor 19 thus acts as a variable resistance which controls the charging rate of capacitor 20. The output voltage across capacitor 20 taken at the collector of transistor 19 is proportional to the integration of the input signal. When this voltage reaches a predetermined value, the unijunction transistor 21 will fire and the entire charge built up on capacitor 20 will dump into the unijunction's load resistor 22. This is a repetitive phenomena which will produce a series of pulses, the freuqency of which is a direct function of the analog input signal. The circuitry just described may therefore be described as a voltage to frequency converter circuit. The pulses taken across load resistor 22 are then fed into a motor logic circuit 23 which shapes the pulses and switches the shaped pulses in the proper sequence to drive a two-phase stepper motor 24. These shaped pulses are then amplified to a level sufficient to drive the stepper motor 24 directly. The output of the stepper motor 24 is coupled to a bidirectional helical cam and follower 25 which translates the rotary motion of the stepper motor 24 into the zigzag motion of the integrator pen 26.

Figure 2A:
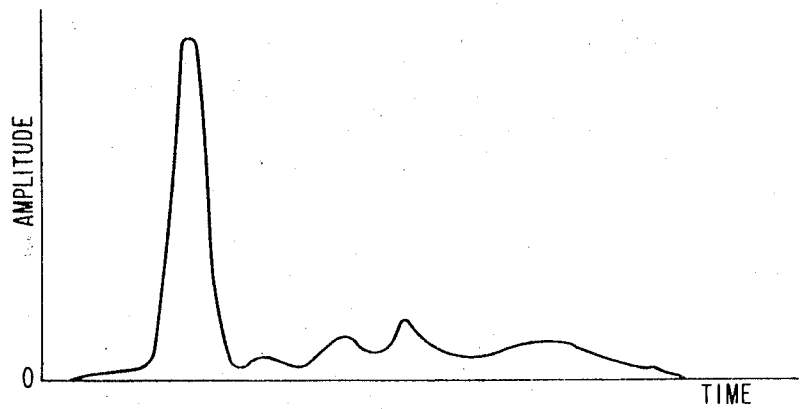
FIGS. 2A and 2B illustrate typical traces produced by the signal and integrator pens, respectively, of the apparatus shown in FIG. 1.
Figure 2B:
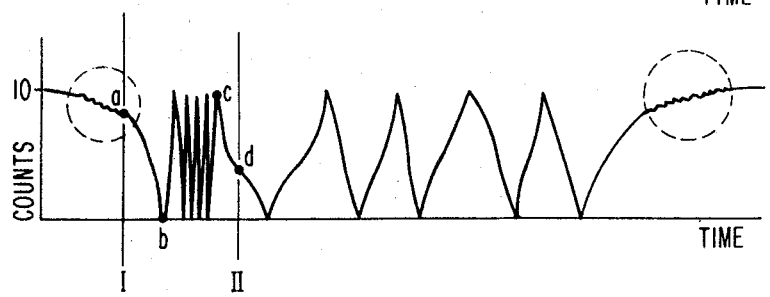

The recording system as described above thus providees a built-in electronic integrator with an electromechanical output which records the area trace simultaneously with the signal trace. Examples of traces produced by the system are shown in FIGS. 2A and 2B wherein FIG. 2A represents a characteristic signal trace and FIG. 2B represents a corresponding area trace. The measured area is in effect obtained by a continuous multiplication of the paper length by the input signal. The total distance traversed by the integrator pen is proportional to this product and is thus a measure of the area between the signal trace and the zero base line. Because of this continuous integration, it is possible to select any two points on the time axis, between which the record is of interest, and read off the corresponding area. In FIG. 2B, it is assumed that the recording width is arbitrarily divided into ten equal spaces. Each space is referred to as one "integrator count." A recording from one edge to the other, encompassing ten such spaces, is referred to as a "traverse." Depending on the integration constant, which may be easily varied by adjusting the controlled current source supplying transistor 19, and the recording width, each count will equal some fraction of a square inch of area. In a specific example of a recording and integrator unit which has been built according to the invention, a count may equal 0.0125 square inches or a traverse represents an area of 0.125 square inches. However, for most applications, the actual area in square inches is not of particular interest. Instead, one is usually interested in the relative area of one section to that of another. It is therefore not necessary to compute the number of square inches, but instead to use only the integrator counts directly.

Because the integrator pen 26 is driven by stepper motor 24, the integrator recording can be seen to be made up of very small, individual discrete steps for very small signal amplitudes as shown in the encircled areas of FIG. 2B. As the movement of the integrator pen speeds up, these discrete steps disappear and blend into a smooth continuous line. Each discrete step corresponds to one pulse from the voltage to frequency converter. These steps in no way, however, interfere with the analysis.

In evaluating an integrator trace, the procedure is as follows: First, extend two lines across the integration strip at right angles to the time axis, one at the beginning and one at the end of the selected area to be measured. Then, total the number of integrator counts within these two extended lines. This is usually easier if the complete integrator traverses are totaled separately. For example, to determine the area between lines I and II in FIG. 2B, there are nine complete traverses between points $b$ and $c$ or 90 integrator coutns. With a suitably large enough integrator recording width provided, it may be possible to estimate fractions of an integrator count. Thus, between points $b$ and a there are approximately 7.8 counts, and between points $c$ and d there are approximately 5.8 counts. We therefore arrive at a total of 103.6 counts for the large area under the signal curve in this example. If it is desired to calculate the exact area in square inches it is only necessary to multiply the number of integrator counts by 0.0125. The actual area is then 103.6 times 0.0125 or 1.295 square inches.

For a simplified description of the operation of the stepper motor 24 reference is made to FIG. 3. Motor 24 is a two phase stepper motor and comprises four windings 27, 28, 29 and 30 which are respectively connected at one end by way of switches S1, S2, S3 and S4 to a source of energizing voltage 31. The other ends of windings 27 and 28 are commonly connected through a ballast resistor 32 to the return side of voltage source 31. In like manner, the other ends of windings 29 and 30 are commonly connected through a ballast resistor 33 to the return side of voltage source 31.

The table in FIG. 3A indicates the switching sequence of switches S1, S2, S3 and S4 to produce a prescribed output from the stepper motor 24. In a specific example, each such switching sequence will produce a single step from the stepper motor of the or 32 such switching sequences for one complete revolution of the motor's output shaft.

Figure 4:
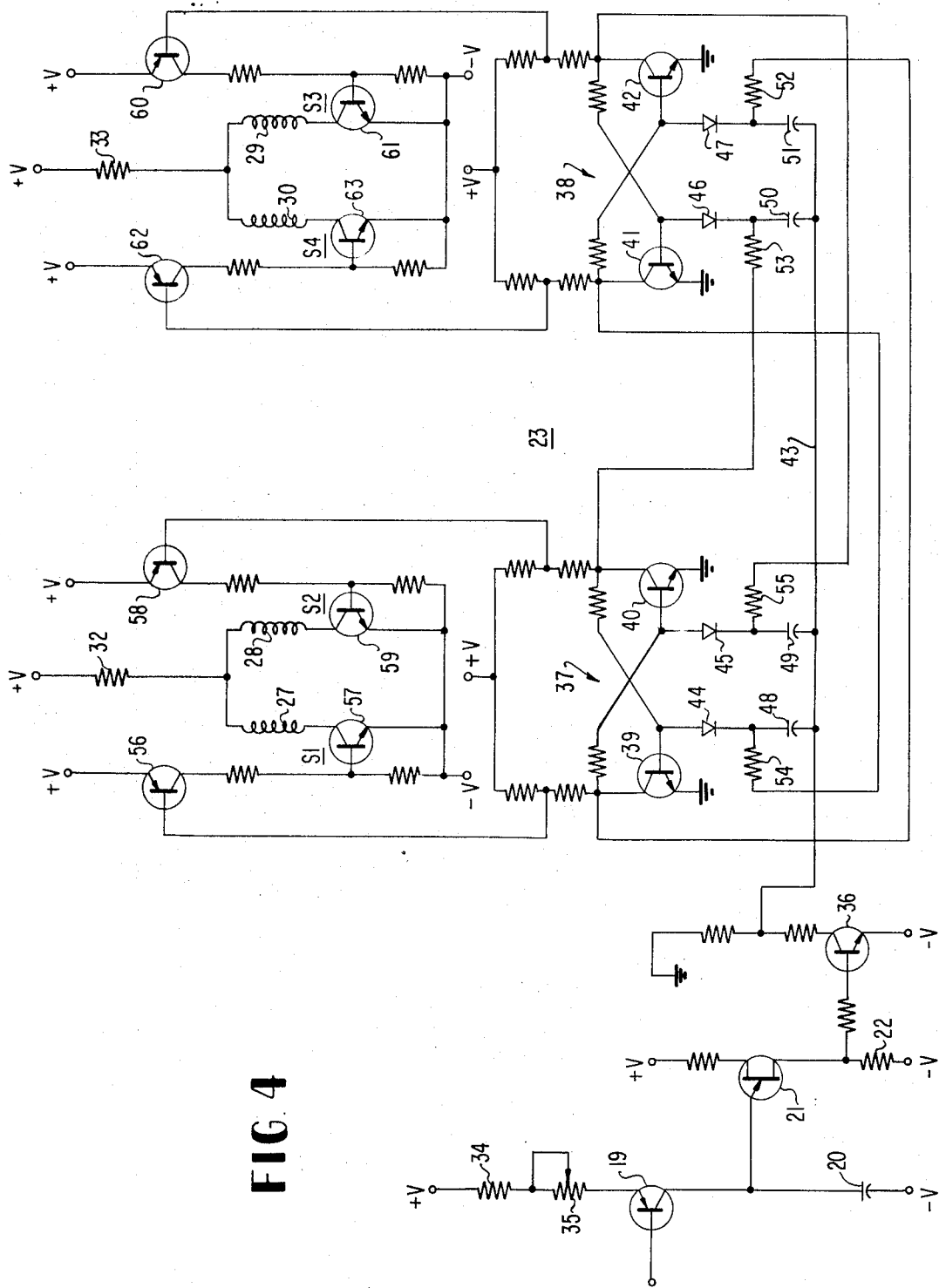
FIG. 4 is a schematic diagram of the electronic integrator and voltage to frequency converter according to the invention.

FIG. 5 shows the waveforms required to produce the switching sequences for switches S1, S2, S3 and S4. These waveforms are produced by the circuitry shown in FIG. 4. As shown therein, transistor 19, which acts as a variable resistor, has its emitter connected to a source of positive voltage by way of resistance network which includes fixed resistor 34 and variable resistor 35. By appropriately adjusting variable resistor 35, the integration time constant can be varied as desired. This in turn has the effect of varying the scale on the chart recording. The output voltage waveform from capacitor 20 as shown in FIG. 5a is applied to the emitter of unijunction transistor 21. As previously described, the charge on capacitor 20 is periodically dumped into load resistor 22 by the firing of unijunction 21. The voltage across resistor 22 is suitably amplified by transistor 36 to produce the triggering waveform shown in FIG. 5b. The output of transistor 36 is applied to two symmetrically triggered bistable multivibrators 37 and 38 in the motor logic 23. Multivibrators 37 and 38 are of generally typical construction and comprise a pair of cross-coupled transistors 39–40 and 41–42, respectively. The bases of transistors 39 to 42 are connected to the trigger line 43 by way of steering diodes 44 to 47 as is usual. Steering diodes 44 to 47 are not, however, directly connected to trigger line 43 but, rather, by way of capacitors 48 to 51, respectively. The two multivibrators 37 and 38 are cross-coupled to one another in the following manner: The collector of transistor 39 is connected through charging resistor 52 to the junction of diode 47 and capacitor 51. The collector of transistor 40 is connected through charging resistor 53 to the junction of diode 46 and capacitor 50. The collector of transistor 41 is connected through charging resistor 54 to the junction of diode 44 and capacitor 48. Finally, the collector of transistor 42 is connected through charging resistor 55 to the junction of diode 45 and capacitor 49.

The operation of the circuit thus far described is as follows: Assume that transistor 39 and 41 are both on, i.e. conducting, while transistors 40 and 42 are off. In a conventional symmetrically triggered bistable multivibrator, the next trigger pulse is "steered" by the steering diodes to the base of the transistor which is conducting. The trigger pulse has the effect of turning the conducting transistor off which in turn causes the other transistor of the pair to turn on. In the circuit shown in FIG. 4, however, the two multivibrators 37 and 38 are interconnected so that the state of one affects the switching of the other and vice versa. For example, since transistor 40 is off, a positive voltage appears at it collector. This positive voltage cause a charging current to flow through resistor 53 and charge capacitor 50. On the other hand, however, ground voltage appears at the collector of transistor 41 so no charge is accumulated on capacitor 48. The next trigger pulse is coupled through capacitor 48 and diode 44 to the base of transistor 39 with the result that bistable multivibrator 37 changes state. This is not true of bistable multivibrator 38, however, since the charge on capacitor 50 blocks the trigger pulse. Once transistor 40 begins to conduct, the charge on capacitor 50 is quickly conducted to ground thereby permitting the next trigger pulse to cause multivibrator 38 to change state. This time, however, multivibrator 37 is prevented from changing state by the charge on capacitor 49. Thus, multivibrator 37 and multivibrator 38 switch on different alternate trigger pulses.

The collector output of transistor 39 is connected to an amplifying switch arrangement comprising a complementary pair of transistors 56 and 57. These transistors are the switch S1 and are operative to connect winding 27 of motor 24 to the negative side of the energizing voltage. The waveform c in FIG. 5 is that appearing at the base of transistor 57. In like manner, complementary transistor pair 58–59 constituting switch S2 are connected to the collector output of transistor 40. Switch S3 is composed of complementary transistor pair 60–61 and is connected to the collector output of transistor 42, while switch S4 is composed of complementary transistor pair 62–63 and is connected to the collector output of transistor 41. The waveforms labeled d, e and f in FIG. 5 are those appearing at the bases of transistors 59, 61 and 63, respectively.

In the preferred embodiment illustrated in FIG. 1, pen 26 is driven in response to the series of pulses developed across resistor 22. Electrically, this series of pulses has a frequency that is a direct function of the analog input signal to transistor 19. However, in terms of the integration being performed over a given interval, the number of pulses over that interval represents the integral of the analog input signal over that interval. Since each pulse represents one unit of area under the traced curve (FIG. 2A) of the input signal, the number of pulses during a given interval represents the corresponding area under the curve of the input signal for the given interval. The series of pulses developed across resistor 22 can be processed by other techniques to control the trace of pen 26 as shown in the modifications of FIGS. 6, 7 and 8.

Figure 6:
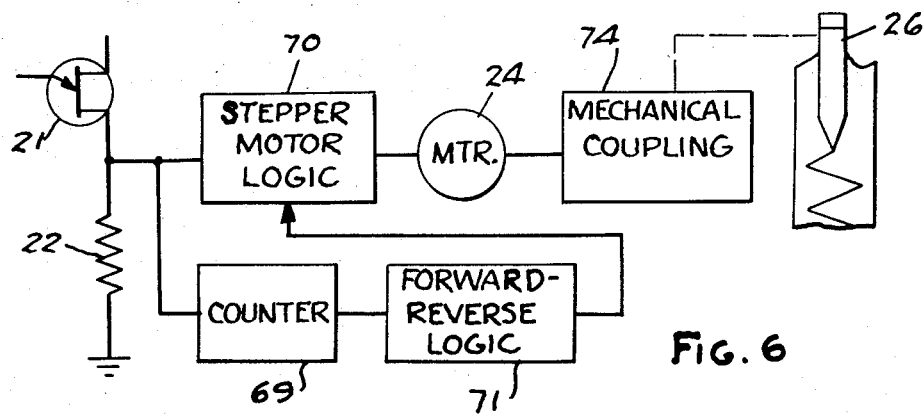
Figure 7:
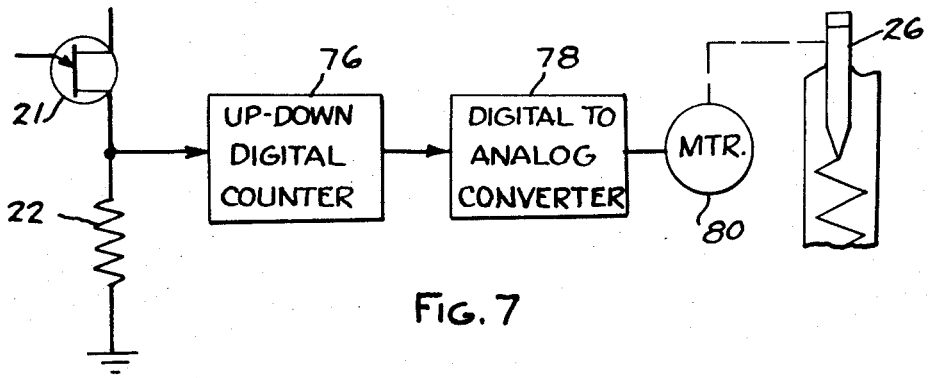

FIG. 6 shows a first modification for driving integrator pen 26 from the pulses produced at resistor 22. The input terminal of the stepper motor logic 70 is connected to the common terminal of unijunction 21 and resistor 22. Stepper motor logic 70 is in turn connected to stepper motor 24. The output shaft of stepper motor 24 is adapted to drive integrator pen 26 by means of a mechanical coupling 74. The pulses developed across resistor 22 are also fed to a counter 69, the output of which drives forward-reverse logic 71. Logic 71, in turn, controls the stepper motor logic 70 to cause the motor 24 to step first in one direction for a predetermined number of pulses and then in the reverse direction for the predetermined number of pulses.

In operation stepper motor logic 70 receives the pulses appearing across resistor 22 and drives stepper motor 24 in a manner similar to that previously described. Stepper motor 24 is advanced in one direction by progressing through steps 1 through 4 of FIG. 3A in ascending order (1–2–3–4–1 . . . ). This is accomplished by switching switches S1 through S4 "on" and "off" according to FIG. 3A. Counter 69 comprises suitably interconnected flip-flops to count the number of pulses stepping the motor 24 in one direction. When the count reaches a predetermined number, counter 69 sends a signal to logic 71. In response to this signal the forward-reverse logic 71 controls the stepper motor logic 70 so that the stepper motor 24 is advanced in the opposite direction by switching through the steps in descending order (4–3–2–1–4 . . . ). Counter 69 then counts the pulses from resistor 22 while the motor is stepping in the reverse direction until the predetermined count is reached, at which point counter 69 causes the forward-reverse logic 71 to send a move-forward instruction to the stepper motor logic 70.

The motor reversing is accomplished by shifting the phase of the waveforms of FIGS. 5c and 5d 180° relative to that of the waveforms of FIGS. 5e and 5f. When the predetermined count is reached and direction of the motor is reversed, counter 69 resets to count the number of steps in the reverse direction. When the count once again reaches the predetermined number, the motor is reversed by removing the 180° phase shift.

Mechanical coupling 74 of motor 24 to integrator pen 26 is provided by a suitable arrangement, such as by cables and pulleys. Thus as motor 24 is rotated in one direction pen 26 traverses across the recording paper in one direction; as motor 24 rotates in the other direction, the travel of pen 26 is reversed.

FIG. 7 shows a second modification for processing the pulses generated across resistor 22. An up-down digital counter 76 has its input connected to the common terminal of unijunction 21 and resistor 22. The output of counter 76 is applied to a digital to analog converter 78. Converter 78 in turn drives a pen motor 80 to which is mechanically coupled pen 26.

Counter 76 has a multiplicity of flip-flops arranged so that when the "up" count reaches a predetermined number the next pulse appearing at the input of the counter is subtracted from the count so that the counter begins counting "down." When the count has been reduced to zero the sequence is repeated. The magnitude of the output signal developed by converter 78 varies with and is directly proportional to the count of counter 76. Pen motor 80 is an electro-mechanical transducer with mechanical output proportional to the magntidue of the converter output signal. Pen motor 80 has an output shaft fixed to a moving iron core similar to and functioning in the same manner as a moving-coil galvanometer. One such pen motor is sold by Materials For Electronics, Inc., Cambridge, Massachusetts, as Model No. R7-154. Thus, motor 80 causes pen 26 to traverse across the recording paper in one direction during the "up" count at counter 76 and across the paper in the other direction during the "down" count.

FIG. 8 shows a third modification for processing pulses appearing across resistor 22. The input of a triangular wave generator 82 is connected to the common terminal of unijunction 21 and resistor 22. The output of triangular wave generator 82 is supplied to a pulse generator 84 and to one terminal of a summing junction 86. The output of pulse generator 84 is fed to a counter 87 which in turn triggers a monostable multivibrator 88. The output of multivibrator 88 is connected to another terminal of junction 86 for summation with the triangular waveform from generator 82. The sum signal is amplified by amplifier 90 to drive pen motor 80 having the construction described in connection with FIG. 7.

Figure 9A:
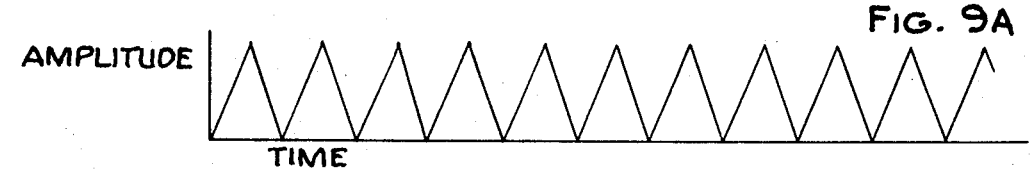
FIGS. 9A, 9B and 9C are typical waveforms generated in the third modification of FIG. 8.

Wave generator 82 develops one triangular output pulse for each input pulse at resistor 22. A series of these triangular pulses is shown in FIG. 9A for input pulses having a constant repetition rate. These triangular pulses are applied through amplifier 90 via line 92 to drive motor 80 in a zigzag pattern. In this embodiment pen 26 "traverses" in one direction in response to the leading edge of each triangular pulse and in the other direction in response to the trailing edge of the pulse.

Figure 9B:
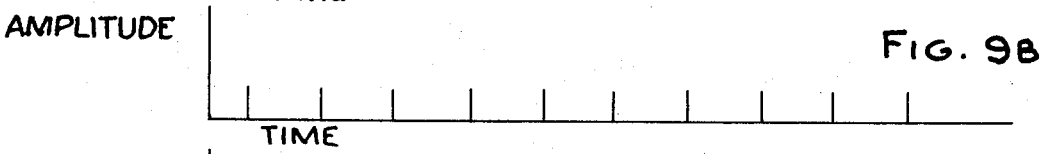
Figure 9C:
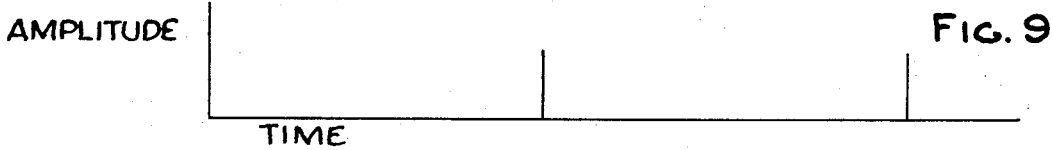

The output of wave generator 82 is also applied to pulse generator 84 which produces a series of pulses (FIG. 9B) transmitted through connection 94 to the input of counter 87. Generator 84 supplies one output pulse at the peak of each triangular pulse, as shown in FIGS. 9A and 9B. Counter 87 applies a pulse to multivibrator 88 along line 96 in response to a predetermined number of pulses from generator 84. For example, FIG. 9C shows the output of counter 87 where the counter supplies one output pulse for every five input pulses from generator 84. Multivibrator 88 shapes each input pulse from counter 87 into a pulse of sufficient magnitude and duration to cause a slight displacement of pen 26. Since the output of multivibrator is added at junction 86 to the peak of every fifth triangular shaped pulse, pen 26 is deflected slightly beyond its normal traverse. FIG. 10 shows a typical trace having markers 98 produced by this additional deflection of pen 26 superimposed on every tenth traverse. It will be appreciated that pen 26 performs two traverses (a deflection and a return) in response to each input pulse appearing across resistor 22. Thus, the number of traverses between adjacent markers represents five units of area. This particular arrangement provides improved resolution over the arrangements previously described since the scale of the recording is greatly increased as compared to the scale of the other arrangements.

There has thus been described a recorder and integrator unit which produces superior results by providing significantly increased accuracy with greater ease. Whereas a very large recording width would normally be required to continuously record a positive area, only a narrow strip of the total chart width is required by the invention. It will, however, be apparent that the embodiments shown are only exemplary and that various modifications can be made in construction and arrangment within the scope of the invention as defined in the appended claims.

I claim:

1. A recording and integrator unit for recording a trace of the amplitude of an electric input signal and a trace of an integrated function of the electric input signal comprising input means for receiving the electric input signal, a servo-mechanicanism signal tracer means connected with said input means and having a servo-motor mechanically coupled with a signal pen to provide the trace of the amplitude of the electric input signal received by said input means, a voltage controlled variable resistance directly connected to said input means, a charging capacitor connected in series with said voltage controlled variable resistance, said voltage controlled variable resistance being responsive to said electric input signal to vary the charging rate of said capacitor to develop an output signal at the junction of said voltage controlled variable resistance and said charging capacitor, a voltage sensitive switching device connected to said junction, a load resistor connected in series with said voltage sensitive switching device such that said voltage sensitive switching device operates to periodically discharge said capacitor through said load resistor to generate a series of pulses the number of which over a given interval represents the integral of the electric input signal over that interval, electronic motor control means connected with the junction of said voltage sensitive switching device and said load resistor, a motor connected with said electronic motor control means, an integrator pen mechanically coupled with said motor for providing a trace of the integrated function of the electric input signal, and reversing means operatively associated with said motor for automatically reversing the direction of said integrator pen as soon as it has travelled a certain predetermined portion of the width of a recording chart to produce a continuous zigzag trace of the integrated function of the electric input signal wherein the traverses in both directions of the integrator pen produce segments of the continuous trace of the integrated function which continuous trace requires only a narrow strip of the total recording chart width.

2. The recording and integrator unit of claim 1 wherein said motor comprises a two phase stepper motor, and said electronic motor control means comprises first and second symmetrically triggered bistable multivibrators connected to receive said series of pulses as trigger pulses, said first and second multivibrators being cross-coupled so as to change state on different alternate ones of said trigger pulses, and first and second electronic switch means and third and fourth electronic swich means controlled by said first and second multivibrators respectively for supplying energizing current to said stepper motor.

3. The recording and integrator unit of claim 2 wherein said first, second, third and fourth electronic switch means each comprise a complementary pair of transistors.

4. The recording and integrator unit of claim 2 wherein said reversing means comprises a by-directional helical cam and follower mechanically coupled between said stepper motor and said integrator pen.

5. The recording and integrator unit of claim 1 wherein said motor comprises a multiple phase stepper motor, said electronic motor control means comprises stepper motor logic means adapted to step said motor in one direction in response to a forward stepping instruction and to step said motor in the opposite direction in response to a reverse stepping instruction, and said reversing means comprises pulse counting means responsive to a particular pulse of each successive group of a predetermined number of pulses of said series of pulses to provide an output signal, and forward-reverse logic means responsive to said counter output signal to alternately provide forward and reverse stepping instructions to said stepper motor logic means.

6. The recording and integrator unit of claim 1 in which said motor comprises a pen motor having an output shaft mechanically coupled with said integrator pen, and said electronic motor control means and said reversing means comprise up-down counter means responsive to said pulses to alternately count up from a first predetermined number to a second predetermined number and then down from said second predetermined number to said first predetermined number, and digital to analog convertor means connected with said counter and operable to develop an output signal the magnitude of which is proportional to the count of said counter, said digital to analog convertor means being connected to said pen motor such that said integrator pen is traversed in one direction as said counter means counts up and is then traversed in the opposite direction as said counter means counts down.

7. The recording and integrator unit of claim 1 wherein said motor comprises a pen motor having an output shaft mechanically coupled with said integrator pen, and said electronic motor control means and said reversing means comprises generator means responsive to each pulse in said series of pulses to generate an output signal of generally peaked wave form with said output signal of said generator means being connected with said pen motor such that said integrator pen is traversed in one direction in response to a portion of said wave form leading said peak and to traverse said integrator pen in the opposite direction in response to a portion of said wave form trailing said peak.

8. The recording and integrator unit of claim 7 wherein said electronic motor control means further comprises second generator means producing an output signal of a series of second pulses spaced apart in accordance with a constant predetermined number of said peaks of said wave form, each of said second pulses being synchronized with the peak of its respective peaked wave form, and means for summing each of said second pulses with its respective peaked wave form to extend the traverse of said integrator pen associated with said respective peaked wave form, whereby the periodically extended traverses of said integrator pen facilitate the determination of the number of traverses of the integrator pen between two spaced points on the continuous zigzag trace of the integrated function of the electric input signal.

9. A recording and integrator unit for recording a trace of the amplitude of an electric input signal and a trace of an integrated function of the electric input signal comprising input means for receiving the electric input signal, signal tracer means having a first motor electrically connected with said input means and mechanically coupled with a signal pen to provide the trace of the amplitude of the electric input signal received by said input means, electronic integrator means electrically connected to said input means to receive said electric input signal independently of any influence on said electric input signal by said signal tracer means and responsive to said electric input signal to develop an electric output signal which over a given interval represents the integral of said electric input signal over that interval, electronic motor control means responsive to said electric output signal, a second motor connected with said electronic motor control means, an integrator pen mechanically coupled with said second motor for providing a trace of the integrated function of the electric input signal, and reversing means operatively associated with said second motor for automatically reversing the direction of said integrator pen as soon as it has traveled a certain predetermined portion of the width of the recording chart to produce a continuous zigzag trace of the integrated function of the electric input signal wherein the traverses in both directions of the integrator pen produce segments of the continuous trace of the integrated function which continous trace requires only a narrow strip of the total recording chart width.

10. The recording and integrator unit of claim 9 wherein said electronic integrator means comprises a voltage to frequency convertor responsive to said electric input signal.

11. The recording and integrator unit of claim 9 wherein said electronic integrator means comprises a voltage to frequency convertor responsive to said input signal for generating a series of pulses the frequency of which is a direct function of said electric input signal with the number of pulses in said series over a given interval representing the integral of said electric input signal over said interval.

12. The recording and integrator unit of claim 10 wherein said signal tracer means comprises a servo-mechanism electric input signal tracer means with said first motor being a servo-motor and said second motor comprises a pen motor responsive to said electric output signal.

13. The recroding and integrator unit of claim 11 wherein said second motor comprises a multiple phase stepper motor, said electronic motor control means comprises stepper motor logic means adapted to step said second motor in one direction in response to a forward stepping instruction and to step said second motor in the opposite direction in response to a reverse stepping instruction, and said reversing means comprises pulse counting means responsive to a particular pulse of each successive group of a predetermined number of pulses of said series of pulses to provide an output signal and forward-reverse logic means responsive to said counter output signal to alternately provide forward and reverse stepping instructions to said stepper motor logic means.

14. The recording and integrator unit of claim 11 in which said second motor comprises a pen motor having an output shaft mechanically coupled with said integrator pen, and said electronic motor control means and said reversing means comprise up-down counter means responsive to said pulses to alternately count up from a first predetermined number to a second predetermined number and then down from said second predetermined number to said first predetermined number, and digital to analog convertor means connected with said counter and operable to develop an output signal the magnitude of which is proportional to the count of said counter, said digital to analog convertor means being connected to said pen motor such that said integrator pen is traversed in one direction as said counter means counts up and is then traversed in the opposite direction as said counter means counts down.

15. The recording and integrator unit of claim 11 wherein said second motor comprises a pen motor having an output shaft mechanically coupled with said integrator pen, and said electronic motor control means and said reversing means comprises generator means responsive to each pulse in said series of pulses to generate an output signal of generally peaked wave form with said output signal of said generator means being connected with said pen motor such that said integrator pen is traversed in one direction in response to a portion of said wave form leading said peak and to traverse said integrator pen in the opposite direction in response to a portion of said wave form trailing said peak.

* * * * *